Patented Nov. 19, 1946

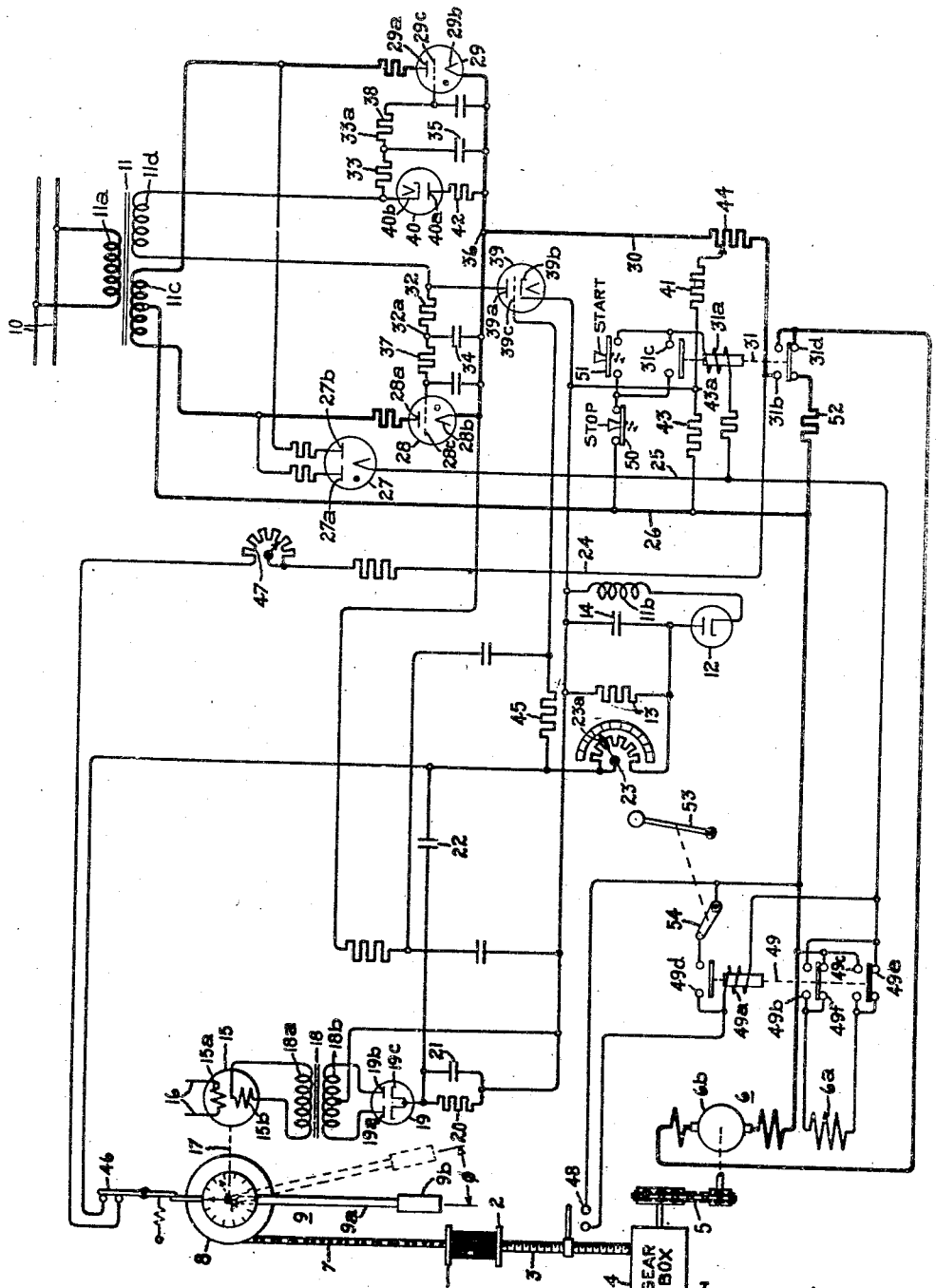

2,411,451

UNITED STATES PATENT OFFICE 2,411,451

CONTROL APPARATUS FOR TESTING MACHINES

Robert J. Demartini, Schenectady, and Henry H. Leigh, Scotia, N. Y., assignors to General Electric Company, a corporation of New York Application March 31, 1945, Serial No. 585,962

11 Claims. (Cl. 73—90)

This invention relates to the testing of materials, more particularly to apparatus for testing material samples, and it has for an object the provision of a simple, reliable, inexpensive, and improved apparatus of this character.

In the testing of many materials such as textile fabrics, the apparent strength of the material as determined by a testing machine varies materially with variations in the rate at which load is applied to the test sample. The rate of application of load to the material sample, in turn, depends upon the elasticity or "stretchiness" of the material sample. Consequently, markedly different indications of tensile strength are obtained from material samples having the same actual tensile strength but having different elasticities. Accordingly, a further object of this invention is the provision of means for controlling a testing machine in such a manner that the rate of application of load to the test sample is independent of the elasticity of the material and therefore reproducible from sample to sample.

Another object of the invention is the provision of improved means for controlling the testing machine in such a manner that the application of load is substantially uniform for all materials irrespective of their elasticity.

Another object of the invention is the provision of improved apparatus of the character described in the foregoing in which the initial rate at which load is imposed on the sample is low so that substantially all possibility of shock is eliminated.

A still further object of the invention is the provision of means for compensating for the RI drop of the motor which drives the testing machine when the stretch is being taken out of the material specimen prior to the application of load.

In carrying the invention into effect in one form thereof, a testing machine is utilized which has a pair of members for holding the test sample. One of these members is driven by an electric motor in a direction to apply a force to the sample. Means are provided for producing a constant reference voltage which corresponds to a predetermined constant rate. Additional means are provided for producing a signal voltage which corresponds to the rate of application of load or force to the material sample. The difference between the two voltages is utilized to control the motor which drives the testing machine to equalize the rate at which the load is being applied to the sample with the predetermined rate of application of load. In one specific embodiment of the invention a potentiometer is used to provide a reference voltage, and an induction voltage regulator, and resistance capacitance circuit associated therewith supplies to a second potentiometer a signal voltage which is proportional to the rate of application of load to the material specimen. The difference of these two voltages is utilized to control suitable electric valve apparatus to control the supply of current to the motor which drives the testing machine to equalize the two voltages, thereby to effect application of load to the specimen at a constant rate.

For a better and more complete understanding of the invention, reference should now be had to the following specification and to the accompanying drawing of which the single figure is a simple, diagrammatical sketch of an embodiment of the invention.

Referring now to the drawing, a material testing machine is illustrated as being provided with two members 1 and 2 for holding a sample of the material which is to be tested for tensile strength. Each of the members 1 and 2 may be a conventional pair of jaws for securely gripping the sample. The lower pair of jaws 2 is mounted on a screw 3 which is in threaded engagement with a nut (not shown) within the gear box 4. The nut is connected through a gear train and a chain and sprocket drive 5 to the shaft of an electric motor 6. Although the motor 6 may be of any suitable type, it is illustrated as a separately excited D.-C. motor.

The upper pair of jaws 1 is connected through a chain 7 to a drum 8 which is rotatably mounted on the frame of the machine. Secured to the drum is a pendulum 9 comprising an arm 9a having a weight 9b on the free end.

In order to cause the load to be applied to the test sample at a uniform rate, suitable means are provided for comparing the rate of application of load to the test sample with a constant reference rate, and utilizing the difference to control the speed of the motor 6.

The load on the test sample varies with the angular position of the pendulum. Since the weight of the pendulum remains constant, the load on the sample varies with the length of the moment arm of the weight 9b about the center of the drum 8. The length of this moment arm is proportional to the sine of the angle $\theta$ between the arm of the pendulum and the vertical.

The reference voltage which corresponds to a predetermined rate of application of load to the material specimen is derived from the source of alternating voltage 10 by means of a transformer 11, a rectifier 12 and a potentiometer 13. The transformer has a primary winding 11a and three secondary windings 11b, 11c, and 11d. The rectifier 12 is illustrated as a diode electric valve. It is connected in series with the potentiometer 13 across the secondary winding 11b and supplies a rectified voltage to the potentiometer which is maintained substantially constant by the capacitor during the half cycle of anode-voltage in which the rectifier is not conducting. The voltage which appears across the potentiometer 13 is the reference voltage.

For the purpose of providing an indication of the rate of application of load to the material specimen an induction voltage regulator 15 is provided. This induction voltage regulator has a stator coil 15a and an inductively related rotor coil 15b mounted upon the rotor member. The stator coil is supplied with alternating voltage from a suitable source such as represented by the two supply lines 16. This source may be and preferably is the same source as that represented by the supply lines 10. The rotor member upon which the rotor coil 15b is mounted is mechanically connected by means of a shaft 17 or other suitable coupling to the shaft of the testing machine drum 8. When the axis of the rotor coil 15b is at right angles to the axis of the stator coil 15a the voltage induced in the rotor coil is zero. For all other positions of the rotor coil the induced voltage is proportioned to the sine of the angle between the axis of the rotor coil and its zero position. The connection between the shaft of the drum 8 and the shaft of the rotor coil is made so that the axis of the rotor coil is perpendicular to the axis of the stator coil when the pendulum is in its vertical or zero position. Since the rotor coil is rotated in response to rotation of the pendulum, the voltage induced in the secondary winding is proportional to the sine of angle $\phi$. Thus it is proportional to the load applied to the material sample.

This alternating voltage is supplied to the primary winding 18a of a transformer 18. The voltage induced in the secondary winding 18b is rectified by means of a rectifier 19. This rectifier is illustrated as a double diode electric valve of which the anodes 19a and 19b are connected to opposite terminals of the secondary winding 18b. A resistor 20 is connected between the cathode 19c and the center tap of the secondary winding. As a result of this connection a direct voltage is supplied to the resistor 20 which is proportional to the alternating voltage supplied to the primary winding of the transformer. This direct voltage is therefore proportional to the load applied to the material specimen. This voltage is smoothed by means of a capacitor 21 which is connected in parallel with the resistor 20.

A capacitor 22 and a potentiometer 23 having a slider 23a are connected in series in a circuit across the terminals of resistor 20, and thus the voltage across resistor 20 which is proportional to the load on the material specimen is supplied to this circuit. When the load varies, i. e. when it is being applied to the material specimen, the voltage across resistor 20 varies correspondingly. As a result of the variation of this voltage a charging current I flows through the capacitor 22 and potentiometer 23 which is defined by the equation:

(1) $$I = C\frac{dV}{dT}$$

in which C is the capacity of the capacitor 22 and $$\frac{dV}{dT}$$

is the rate of change of the voltage impressed on the capacitor. The capacity C is fixed, and since the voltage impressed on the capacitor is proportional to the load applied to the material specimen, the current I is proportional to the rate of change, i. e., rate of application of load on the material specimen. This current flowing through the potentiometer 23 produces a signal voltage drop across the potentiometer which is proportional to this current. This signal voltage is thus proportional to the rate of application of load to the material specimen.

For the purpose of providing a control voltage for the operation of the control switches, voltage buses 25 and 26 are provided. A substantially constant direct voltage is supplied to the control voltage buses 25 and 26 by means of suitable rectifying means which is illustrated as a double diode electric valve 27 of which the anodes 27a and 27b are connected to opposite terminals of the secondary winding 11c of the supply transformer 11, and the cathode is connected to the bus 25. The bus 26 is connected to the center tap of the secondary winding 11c of the supply transformer. As thus connected, the valve 27 operates as a full wave rectifier to supply a rectified voltage to the buses 25 and 26. As shown, the separately excited field winding 6a of the motor 6 is connected across the buses 25 and 26.

The armature 6b of the motor 6 is supplied from suitable electric valve means illustrated as a pair of thyratrons 28 and 29. The anodes 28a and 29a of these thyratrons are connected to opposite terminals of the supply transformer secondary winding 11c, and the cathodes 28b and 29b are connected through conductor 30 and the main contacts 31b of contactor 31 to one terminal of the motor armature 6b. The other terminal of the armature is connected to bus 26 which, as pointed out in the foregoing, is connected to the center tap of the secondary winding 11c. As thus connected, the thyratrons 28 and 29 rectify both half-waves of the alternating voltage and supply the rectified voltage to the armature 6b.

The speed of the motor 6 is adjusted by varying the average current conducted by the thyratrons. Although the thyratrons may be controlled by any suitable method, it is preferred to use the method of phase shift control of the grid voltage. For the carrying out of this method of control, a phase shifting resistance-reactance network is provided. This network comprises the secondary winding 11d of the transformer 11, resistors 32 and 33, and capacitors 34 and 35. The resistors and capacitors are connected in series relationship across the secondary winding 11d. The circuit is traced from the left-hand terminal of the secondary winding 11d through resistor 32, capacitor 34, the common cathode connection 36, capacitor 35, and resistor 33 to the opposite terminal of the secondary winding 11d.

The common point 32a of resistor 32 and capacitor 34 is connected through a resistor 37 to the grid 28c of thyratron 28. Similarly, the common point 33a between resistor 33 and capacitor 35 is connected through a resistor 38 to the grid 29c of thyratron 29. The capacitive reactance $X_c$ of the capacitors 34 and 35 is chosen relatively small in comparison with the resistance R of resistors 32 and 33. Thus the alternating voltages across the capacitors 34 and 35 lag the voltage of the secondary winding approximately 90 electrical degrees. Since the voltages across the capacitors 34 and 35 are applied to the grids 28c and 29c, the voltages of grids 28c and 29c lag the voltages of the anodes 28a and 29a, respectively, approximately 90 degrees.

The effect of phase shift of the grid voltage is produced by applying a variable component of direct voltage to the grids in addition to the 90-degree lagging alternating voltage component. This is accomplished by means of a pair of electric valves 39 and 40 connected in series relationship across the transformer secondary 11d. The valve 39 is preferably a triode valve and the valve 40 is preferably a diode valve. The circuit is traced from the left-hand terminal of the secondary winding 11d to the anode 39a of valve 39, cathode 39b, resistor 41, conductor 38 to the common cathode connection 36, resistor 42, anode 40a of valve 40, cathode 40b to the opposite terminal of the secondary winding 11d. Thus, the triode valve 39 is in parallel circuit relationship with capacitor 34 and the diode valve 40 is in parallel circuit relationship with capacitor 35.

When the valves 39 and 40 are conducting, charges are placed on the capacitors 34 and 35, and as a result, a component of direct voltage is applied to the grids 28c and 29c. The combination of this direct voltage component with the lagging alternating component produces the effect of phase shift of the grid voltage and corresponding variation of the average current transmitted by the thyratrons.

The amount of phase shift of the grid voltage of the thyratrons, and consequently the amount of current transmitted by the thyratrons, can be varied by varying the relative conductivities of the triode valve 39 and the diode valve 40. This is accomplished simply by varying the conductivity of the triode valve. For this purpose, the cathode 39b of the triode valve is connected to the upper or positive terminal of the reference voltage potentiometer 13 and the control grid 39c is connected to the slider 23a of the signal voltage potentiometer 23.

If the voltage of the grid 39c becomes less negative or increasingly positive with respect to the voltage of the cathode 39b, the conductivity of valve 39 is increased. This has the effect of retarding the phase of the grid voltage of the thyratrons 28 and 29 thereby to decrease the current supplied to the armature 6b of the motor 6. Conversely, if the grid voltage becomes increasingly negative with respect to the cathode voltage, the phase of the thyratron grid voltage is advanced and the current supplied to the armature is correspondingly increased.

For the purpose of compensating for RI voltage drop in the armature of the motor when operating at low speed, a resistor 43 is connected in series with resistor 41 across the motor armature 6b. These two resistors thus constitute a voltage divider connected across the armature. A third resistor 44 is connected in series with the armature between the cathode of the thyratrons and the positive terminal of the armature. The cathode 39b of the triode valve is connected to the intermediate point 43a of the voltage divider and the grid 39c is connected through resistor 45, the contacts of limit switch 46 and an adjustable potentiometer 47 to the lower terminal of armature voltage drop resistor 44. Any change in current flowing in the armature circuit produces a corresponding change in the voltage drop across resistor 44. Thus if the armature current increases, the terminal of resistor 44 to which the grid 39c is connected becomes more negative. As a result the conductivity of valve 39 is decreased and the phase of the grid voltage of the thyratrons 28 and 29 is advanced to increase the voltage supplied to the armature thereby counteracting or compensating for the RI drop in the armature. The amount of compensation may be adjusted as desired by adjustment of resistor 44.

With the foregoing understanding of the elements and their organization in the completed system, the operation of the system itself will readily be understood from the following detailed description. It is assumed that the apparatus is in the position in which it is illustrated in the drawing with the lower jaws 2 in their uppermost position. At the lowermost position of the lower jaws 2 during the previous test run, the limit switch 48 which is actuated by the screw 3 closed its contacts to complete an energizing circuit for the operating coil 49a of the field contactor 49. In response to energization, contactor 49 closed its normally open contacts 49b, 49c, and 49d and opened its normally closed contacts 49e and 49f. The opening of contacts 49e and 49f and the closing of contacts 49b and 49c reversed the connections of the field winding 6a to provide for rotation of the motor 6 in a direction to drive the lower jaws 2 toward their uppermost position. The closing of contacts 49d completed a sealing-in circuit for the operating coil 49a in parallel with the contacts of the limit switch 48 so that the contactor remained picked up after the contacts of the limit switch 48 opened in response to the upward movement of the jaws 2.

In the uppermost position of the lower jaws 2, a clutch (not shown) in the testing machine is disengaged to interrupt the driving connection between the motor 6 and the screw 3. Assuming that the motor 6 was stopped with the machine in this position by pressing the stop pushbutton switch 50, it is now necessary to restart the motor 6. This is done by momentarily depressing the start pushbutton switch 51 to close its contacts and thereby complete an energizing circuit for the operating coil 31a of the line contactor 31. In response to energization, the line contactor closes its main contacts 31b and interlock contacts 31c and opens its normally closed dynamic braking contacts 31d. The contacts 31 in opening interrupt the dynamic braking circuit through the dynamic braking resistor 52 in parallel with the armature, and the main contacts 31b in closing complete the connections of the armature to the cathodes 28b and 29b of the thyratrons 28 and 29. The closing of contacts 31c in parallel with the contacts of the start pushbutton switch 51 completes a holding circuit for the operating coil of the line contactor so that the start pushbutton switch may now be released. With the contacts of the limit switch 46 in the closed position in which they are illustrated, the voltage of the grid 37c of the valve 37 is adjusted with respect to the voltage of its cathode so that the valve is nearly fully conducting. As a result, the grid voltages of the thyratrons 28 and 29 are retarded to such an extent that the thyratrons supply only a small current to the armature of the motor which therefore rotates at a low creeping speed. For the purpose of maintaining the speed of the motor constant at this low value, the portion of the armature voltage which appears across the resistor 41 less the RI drop voltage across the resistor 44 produced by the armature current is compared with the reference voltage across the potentiometer 13 and the difference is utilized to control the electric valve 39 in such a manner as to correct for any variations in the speed of the motor.

The direction of rotation is such as to drive the lower pair of jaws 2 in an upward direction. However, as pointed out, the lower pair of jaws 2 are in their uppermost position with the clutch between the motor and the screw 3 disengaged so that there is no movement of the jaws at this point in the operation.

The test sample is now firmly secured in the upper and lower jaws 1 and 2. The test run is initiated by shifting the lever 53 to engage the clutch to complete the driving connections between the motor 6 and the screw 3. The shifting of the clutch lever 53 opens contacts 54 to interrupt the holding circuit for the operating coil of the field contactor 49. In response to deenergization, the field contactor drops out to open its normally open contacts 49b, 49c, and 49d and to close its normally closed contacts 49e and 49f. Contacts 49d in opening interrupt the holding circuit for the coil 49a so that the contactor 49 cannot be picked up by a subsequent movement of the lever 49.

The lower jaws 2 start downwardly at a very low speed to remove the stretch from the sample. During this operation the wide variations in the friction of the parts of the testing machine produce corresponding variations in the loading of the motor. The speed of the motor tends to vary erratically in response to these variations in load, but this tendency is effectively counteracted by the RI drop compensating control circuits described in the foregoing. Thus, the provision is made for idling speed during the few seconds intervening between the time the driving gears are engaged and the instant when load is applied to the specimen. No matter how carefully the operator inserts the sample in the jaws, factors such as slack in the textile specimen and backlash in the mechanism of the testing machine remain to cause a shock-load bump at the beginning of the loading cycle. Because the motor speed is maintained constant at a low value the lower jaw continues to move downward at a very slow rate while backlash is taken up and slack and stretch are removed from the sample. When the stretch is completely removed, the pendulum 9 begins to rotate in a counterclockwise direction thereby to apply load to the test sample. After a very small amount of rotation of the pendulum 9, the contacts of limit switch 46 actuated by the pendulum 9 are opened to interrupt the RI drop compensating circuit.

As the pendulum rotates in a counterclockwise direction, the rotor of the induction voltage regulator is correspondingly rotated from its zero position and a signal voltage proportional to the rate of application of load appears across the signal voltage potentiometer 23. Since the negative terminals of the reference and signal voltage potentiometers 13 and 23 are connected together and their positive terminals are connected to the cathode and grid respectively of valve 39 the difference of the reference and signal voltages is supplied between the grid and cathode of the valve. At the instant of opening the limit switch contacts the rotation of the rotor of the induction voltage regulator is relatively slow and consequently the signal voltage is low. Consequently the difference voltage is large and the voltage of the grid 39c is strongly negative. As a result, the conductivity of the valve 39 is decreased and the phase of the grid voltages of the thyratrons 28 and 29 is advanced. The advance in phase of the grid voltages of the thyratrons increases the current supplied to the armature of the motor 6 thereby increasing the speed of the motor 6 and also the downward speed of the jaws 2 driven thereby. The increasing downward speed of the jaws 2 increases the speed of the counterclockwise rotation of the pendulum 9 so that the signal voltage increases and approaches equality with the reference voltage.

When the two voltages become substantially equal, there will be no further increase in the speed of the motor 6. This is an indication that the rate of application of load to the test sample, i. e., the rate of increase of load on the test sample, is equal to the predetermined rate which corresponds to the magnitude of the reference voltage and is therefore uniform.

If the sample has a high elongation characteristic, the rate of application of load to the test sample tends to decrease and the signal voltage tends to become smaller than the reference voltage. The result is that the voltage applied to the grid 39c becomes negative with respect to the voltage of the cathode. Consequently, the conductivity of the valve 39 decreases thereby to advance the phase of the grid voltage of the thyratrons 28 and 29 and to increase the speed of the motor 6 and the rate of application of load.

On the other hand, if the sample has a low elongation characteristic, as is the case when a high count fabric is tested at short gauge, the load on the sample increases at a rate faster than that determined by the reference voltage with the result that the signal voltage tends to become greater than the reference voltage and the voltage of the grid 39c becomes increasingly positive with respect to the voltage of the cathode 39b. This increases the conductivity of the valve 39 and retards the phase of the grid voltages of the thyratrons thereby to decrease the speed of the motor 6 and the rate of application of load. Thus, the rate of application of load to the test sample is maintained uniform throughout the test.

At some point in the downward travel of the lower jaws 2, the test sample is ruptured. Following the rupture of the sample the pendulum and the induction voltage regulator remain stationary in the positions they occupied at the instant of rupture. Consequently the rectified voltage from the induction voltage regulator remains constant and consequently the signal voltage across the potentiometer 23, which is proportional to the rate of change of the rectified voltage, is zero. Therefore the difference between the rate of change signal voltage and the reference voltage is a maximum and thus the voltage of the cathode of the valve 39 becomes so positive with respect to the voltage of its grid that the valve becomes non-conducting. This causes the thyratrons to supply maximum voltage to the motor, thereby causing the motor to drive the lower pair of jaws 2 to the lower end of the downward travel at maximum speed. At the lower end of the downward travel of the jaws 2, the limit switch 48 closes its contacts to complete an energizing circuit for the operating coil 49a of the field contactor 49 which responsively to energization reverses the field connections of the field winding 6a to the source. This reverses the direction of rotation of the motor 6 and causes it to drive the screw 3 and the pair of jaws 2 in an upward direction. This continues until the jaws 2 reach their uppermost position and the clutch in the machine is disengaged to interrupt the driving connections between the motor 6 and the screw 3.

The pendulum, which is held in its upper position by means of a pawl and ratchet mechanism, is manually returned by the operator to its initial position. In returning to its initial position, the contacts of the limit switch 46 are closed to reestablish the armature voltage and RI drop compensating circuit connections to the grid 39c of valve 39 thereby leaving the system in a reset condition for a subsequent test.

The rate of application of load to the material specimen may be adjusted to any desired value within a wide range by adjusting either the reference voltage or the signal voltage. This is preferably accomplished by adjusting the position of the slider 23a of the signal voltage potentiometer which as shown is provided with a cooperating dial calibrated in terms of rate of application of load.

Although in accordance with the provisions of the patent statutes this invention is described as embodied in concrete form and the principle thereof has been explained, together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claims.

What we claim as new and desire to secure by Letters Patent of the United States, is:

1. Control apparatus for a material testing machine comprising an electric motor for applying a load to a material specimen, a source of reference voltage, means for producing a voltage varying with the load applied to said specimen, means for deriving from said varying voltage a signal voltage corresponding to the rate of application of load to said specimen, and means responsive to the difference of said reference voltage and said signal voltage for controlling said motor to maintain the rate of application of load to said specimen constant.

2. Control apparatus for a material testing machine comprising an electric motor for applying a load to a material specimen, a source of reference voltage having a magnitude corresponding to a predetermined rate of application of load to said material specimen, means for producing a signal voltage corresponding to the rate of application of load to said specimen by said motor, means responsive to the difference of said voltages for controlling said motor to equalize said rate of application of load with said predetermined rate, and means for adjusting one of said voltages to adjust said predetermined rate to a desired value.

3. Control apparatus for a material testing machine comprising an electric motor for applying a load to a material specimen, a source of reference voltage, means for producing a voltage varying with the magnitude of the load applied to said specimen, means responsive to the rate of change of said varying voltage for producing a signal voltage having a magnitude corresponding to the rate of application of load to said specimen, and means responsive to the difference of said reference and signal voltages for controlling said motor to maintain said rate of application of load to said specimen substantially constant.

4. Control apparatus for a material testing machine comprising an electric motor for applying a load to a material specimen, a source of reference voltage corresponding to a predetermined rate of application of load to a material specimen, means for producing a direct voltage varying with the magnitude of the load applied to said specimen, means responsive to the rate of change of said direct voltage for producing a signal voltage having a magnitude corresponding to the rate of application of load to said specimen, and electric valve means responsive to the difference of said reference voltage and said signal voltage for controlling said motor to equalize said rate of application of load with said predetermined rate.

5. Control apparatus for a material testing machine comprising an electric motor for applying a load to a material specimen, a source of reference voltage, means for producing a voltage varying with the magnitude of the load applied to said specimen, a control circuit including a capacitor responsive to the rate of change of said varying voltage for producing a signal voltage having a magnitude corresponding to the rate of application of load to said specimen, and means responsive to the difference of said reference and signal voltages for controlling said motor to maintain said rate of application of load to said specimen substantially constant.

6. Control apparatus for a material testing machine comprising an electric motor for applying a load to a material specimen, a potentiometer for providing a reference voltage corresponding to a predetermined rate of application of load to said material specimen, a second potentiometer, means for supplying to said second potentiometer a voltage corresponding to the rate of application of load to said specimen by said motor thereby to provide a signal voltage, means responsive to the difference of said reference and signal voltages for controlling said motor to equalize said rate of application of load with said predetermined rate, and means for adjusting one of said potentiometers to adjust said predetermined rate to a desired value.

7. Control apparatus for a material testing machine comprising an electric motor for applying a load to a material specimen, a potentiometer for providing a reference voltage corresponding to a predetermined rate of application of load to said material specimen, means for producing a voltage varying with the magnitude of the load applied to said material specimen, means responsive to the rate of change of said varying voltage for producing a signal voltage corresponding to the rate of application of load to said specimen comprising a capacitor and a second potentiometer connected in circuit and supplied with said varying voltage, electric valve means responsive to the difference of said reference voltage and said signal voltage for controlling said motor to equalize said rate of application of load with said predetermined rate, and means for adjusting one of said potentiometers thereby to adjust said predetermined rate to a desired value.

8. Control apparatus for a material testing machine comprising an electric motor for applying a load to a material specimen, a source of reference voltage, means comprising an induction voltage regulator responsive to the load applied to said specimen for producing an alternating voltage, means for rectifying said alternating voltage to produce a direct voltage varying with the load applied to said specimen, capacitor means responsive to the rate of change of said direct voltage for producing a signal voltage corresponding to the rate of application of load to said specimen, and means responsive to the difference of said reference voltage and said signal voltage for controlling said motor to effect application of load to said specimen at a constant rate.

9. Control apparatus for a material testing machine comprising an electric motor for applying a load to a material specimen, a potentiometer for providing a reference voltage corresponding to a predetermined rate of application of load to a material specimen, means comprising an induction voltage regulator responsive to the load applied to said specimen for producing an alternating voltage, means for rectifying said alternating voltage to produce a direct voltage varying with the load applied to said specimen, a second potentiometer, capacitor means responsive to the rate of change of said varying direct voltage for supplying to said second potentiometer a signal voltage corresponding to the rate of application of load to said specimen, and electric valve means responsive to the difference of said reference voltage and said signal voltage for controlling said motor to effect application of load to said specimen at a constant rate.

10. Control apparatus for a material testing machine comprising an electric motor for applying a load to a material specimen, electric valve means for controlling the supply of current to said motor for operation at a relatively slow speed, means responsive to the armature current of said motor for controlling said electric valve apparatus to compensate for the RI voltage drop in said armature, means responsive to the application of load to said specimen for rendering said compensating means ineffective, a source of reference voltage, means responsive to the load applied to said specimen for producing a signal voltage corresponding to the rate of application of load to said specimen, and connections for supplying the difference of said reference voltage and said signal voltage to control said motor to effect application of load to said specimen at a constant rate.

11. Control apparatus for a material testing machine comprising an electric motor for applying a load to a material specimen, electric valve means for controlling the supply of current to said motor for operation at a relatively slow speed, a resistor connected in the armature circuit of said motor, means responsive to the voltage drop across said resistor for controlling said electric valve apparatus to compensate for the RI drop in said armature, limit switch means responsive to the application of load to said specimen for rendering said compensating means ineffective, a source of reference voltage, means responsive to the load applied to said specimen for producing a signal voltage corresponding to the rate of application of load to said specimen, and connections for supplying the difference of said reference voltage and said signal voltage to control said motor to effect application of load to said specimen at a constant rate.

ROBERT J. DEMARTINI.
HENRY H. LEIGH.